Aug. 20, 1935.  D. WILSON  2,011,667
VENTILATOR
Filed Feb. 13, 1934
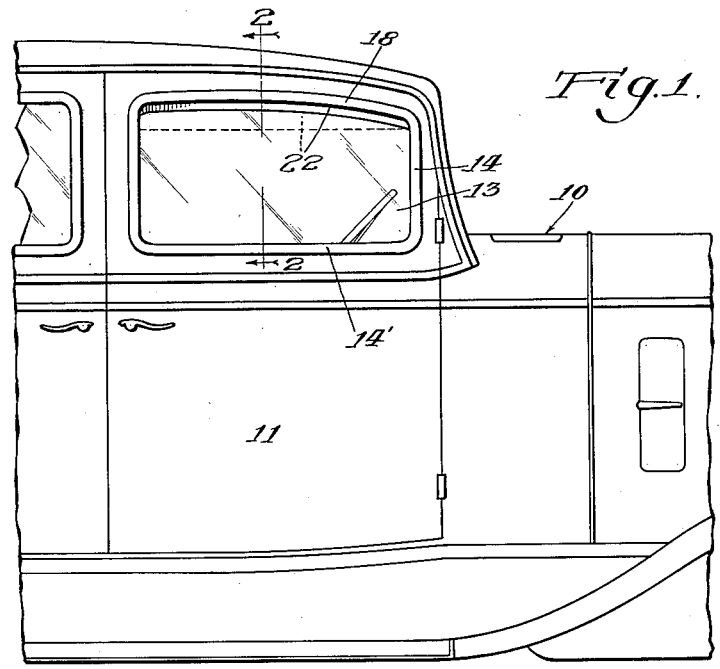
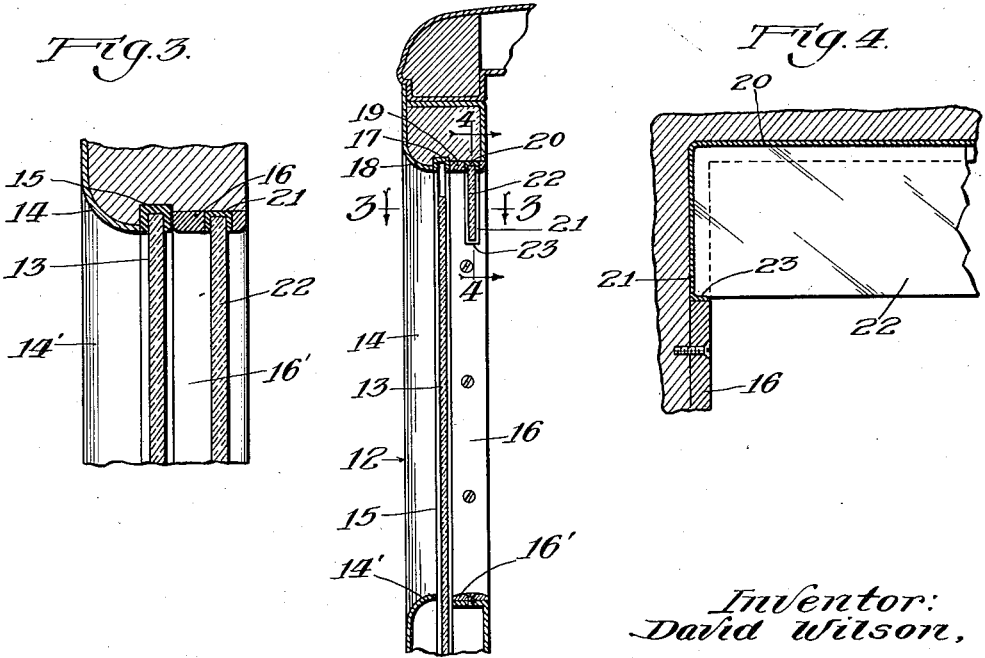
Inventor:
David Wilson,
By: Bertha L. MacGregor
Attorney Patented Aug. 20, 1935

2,011,667

UNITED STATES PATENT OFFICE 2,011,667

VENTILATOR

David Wilson, Brookfield, Ill.

Application February 13, 1934, Serial No. 710,983

2 Claims. (Cl. 98—2)

This invention relates to ventilators and particularly to means for providing ventilation for vehicle bodies.

One of the objects of the invention is to provide efficient ventilation, without objectionable drafts, for automobile bodies. Another object is to provide simple, inexpensive means for accomplishing the desired result, and avoiding the use of sight-obstructing frames or bars such as are now required in the winged type of ventilation.

My construction has the advantage of being easy to install, simple and durable, and efficient for ventilation purposes and protection of passengers from rain. The ventilator does not interfere with complete closing of the window with which it is associated, and it may be installed without requiring alteration of any part of the regular window construction excepting part of the frame located inwardly of the window pane.

In the drawing:

Fig. 1 is a side elevation of part of an automobile body embodying my invention.

Fig. 2 is an enlarged vertical section taken through one of the front side windows and frame, on the line 2—2 of Fig. 1.

Fig. 3 is an enlarged horizontal section taken on the line 3—3 of Fig. 2.

Fig. 4 is an enlarged vertical section taken on the line 4—4 of Fig. 2.

In that embodiment of my invention shown in the drawing, the automobile 10 has a door 11 and window 12. The window pane 13 of glass is mounted inwardly of the external frame 14, in a familiar manner, and is adapted to be raised and lowered relatively to the frame 14. The pane 13 slides in padded grooves 15 formed in each side of the window between the spaced apart outer frame 14 and inner frame 16, and when raised into its uppermost position, completely closing the window opening 12, the pane 13 fits into the horizontal groove 17 formed between the upper cross piece 18 of the outer frame 14 and the upper cross piece 19 of the inner frame 16. The sill of the outer frame is indicated at 14′ and of the inner frame at 16′.

The upper cross piece 19 of the inner frame 16 is grooved as indicated at 20, and the upper portions of the side members of the frame 16 are similarly grooved as indicated at 21 to receive a short depending pane or shield 22 preferably made of non-shatterable glass. The grooves 20 and 21 are padded as are the grooves 15 and 17. The upper and side edges of the shield 22 fit in the grooves 20 and 21, and the lower edge of the shield, at each end, rests on a shoulder 23 at the lower end of each side groove 21.

The shield 23 is preferably three to three and one-half inches in its vertical dimension, extends across the window opening, and is located about one-half to three-quarters inch inwardly of the pane 13 and parallel therewith.

To install my ventilator in a standard motor car having a slidable window pane, it is necessary only to groove the upper portions of the side members of the inner frame 16 and the cross piece 19 of said frame 16, and to remove one of the side members. The shield may then be slipped into the groove 21 of the unremoved side member, to rest on the shoulder 23, and into the horizontal groove 20. When thus positioned the removed side member of the frame 16 may be replaced with its shoulder 23 also supporting the shield, and it is then secured to the car body in the usual manner.

When the window pane 13 is lowered to a point above the lower edge of the shield 22, air currents will strike the shield 22 and pass downwardly and rearwardly into the car, the passage of air into the moving car, through the space between the pane 13 and shield 22 being confined to that part of the space located opposite the rearward half of the shield. This is due to the fact that, as the car moves forwardly, an area of negative pressure is produced rearwardly of the front side frames 14, adjacent the forward portion of the window pane 13, which draws the stale air out through the forward portion of the passageway between pane 13 and shield 22. Thus the car is efficiently ventilated, without undue draft and without obstruction of view.

The shield may be easily removed or replaced, and the installation requires no operating handles or brackets such as are used in the winged type ventilators.

Changes may be made in details of construction without departing from the scope of my invention and I do not intend to be limited to the exact form shown and described, except as set forth in the appended claims.

I claim:—

1. In a vehicle, ventilating means comprising a window, inner and outer frames, a window pane movable between the frames in a vertical plane for closing the window, the inner frame having a groove in its upper cross piece and in the upper portions of its two side members, and a shield located in said grooves in said inner frame members, and depending from the cross piece slightly inwardly of the window pane.

2. In a vehicle, ventilating means comprising a window, inner and outer frames, a window pane movable between the frames in a vertical plane for closing the window, the inner frame having a groove in its upper cross piece and in the upper portions of its two side members, a shoulder at the lower end of each of said last mentioned grooves, and a shield located in said grooves in said inner frame members, and depending from the cross piece slightly inwardly of the window pane and resting at each end on said shoulders.

DAVID WILSON.